Oct. 29, 1929.    J. MESSER    1,733,270
SYSTEM OF AIRPLANE TRANSPORTATION
Filed Dec. 5, 1927
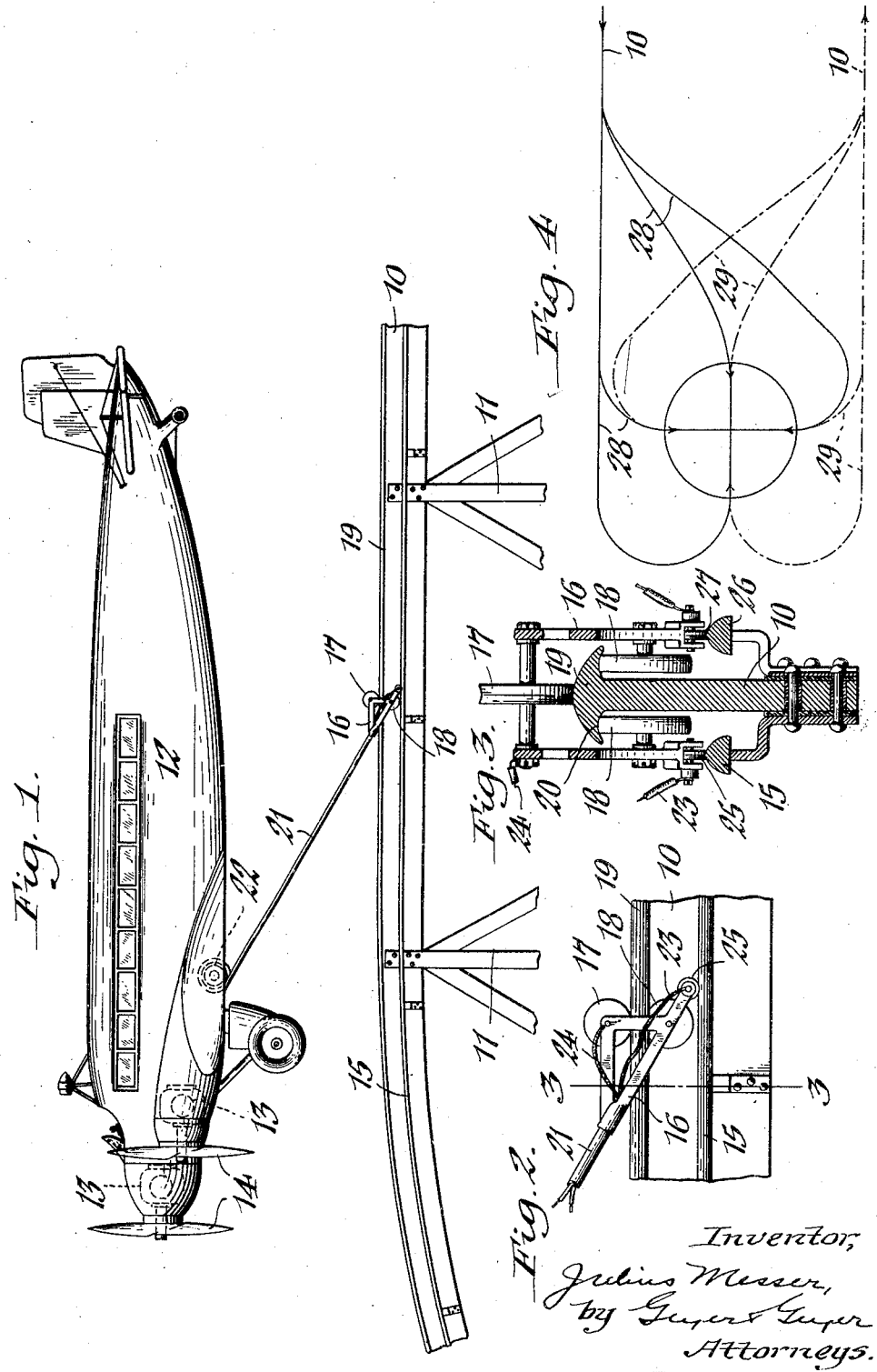

Patented Oct. 29, 1929

1,733,270

UNITED STATES PATENT OFFICE

JULIUS MESSER, OF HEMPSTEAD, NEW YORK

SYSTEM OF AIRPLANE TRANSPORTATION

Application filed December 5, 1927. Serial No. 237,634.

This invention relates generally to a system of airplane transportation and more particularly to an electrically-operated airplane system.

One of its objects is the provision of an electrically-operated system of this character for passenger and commercial service which affords a maximum of safety by providing a continuous and positive supply of current for driving the motor or motors of the airplane, and which holds the latter captive during its flight.

Another object of the invention is the provision of a system of this character which is so organized as to provide a definite directional course for the plane, insuring the same against drifting out of its course and assuring the pilot and passengers against loss of their bearings when traveling from one point to another.

In the accompanying drawings:—

Figure 1 is a side elevation of an apparatus embodying my invention. Figure 2 is an enlarged fragmentary side elevation of the electric trolley employed in connection therewith. Figure 3 is an enlarged transverse section on line 3—3, Figure 2. Figure 4 is a diagrammatic plan view of one form of track arrangement at the air port or landing field.

Similar characters of reference indicate corresponding parts throughout the several views.

In carrying out my invention, I employ an elevated trolley engaging rail 10 supported at suitable intervals above the ground by standards 11 and connecting one air port with another, and serving not only as a guiding and anchoring rail for the air plane, but it also constitutes a support or carrier for the electrical conductors for supplying current to the motors and other devices with which the plane may be equipped, such as telephones, etc.

In the example shown in the drawings, the airplane 12 has electric motors 13 for driving its propellers 14, these motors receiving their current from a conductor 15 applied to the guide rail 10 and insulated therefrom. Mounted on the latter for movement thereon is a suitable trolley consisting of a frame 16 having an upper guide roller 17 and a pair of lower guide rollers 18, which rollers engage the opposing top and bottom sides of the rail-head 19 to prevent vertical displacement of the trolley. Lateral displacement of the trolley relative to the ray may be prevented by providing longitudinal grooves 20 in the underside of the rail-head for receiving the lower rollers 18. A flexible connection or anchoring device, preferably in the form of a conduit 21, serves to couple the airplane with the trolley, one end of said connection being rigidly fastened to one of said parts and the other end being yieldingly connected to the other part, so that the airplane is permitted a certain range of elevation above its guide rail. While any form of yieldable connection may be employed for one end of the flexible conduit 21, that shown in the drawings, by way of example, consists of a winding drum 22 carried by the airplane and tending constantly to wind up the conduit thereon, so that when the airplane approaches the ground the conduit will be automatically wound up on the drum and when the plane rises the conduit will be free to unwind.

Extending through the conduit 21, whose lower end may be rigidly fastened to the trolley-frame 16, are the wires 23, 24 which are included in the circuit of the airplane motors 13, one of them being connected to a contact roller 25 journaled in and insulated from the trolley-frame and in constant engagement with the conductor 15 and the other being grounded to the guide rail 10 through the medium of said trolley-frame.

For the purpose of supplying current to other electrical devices with which the plane may be equipped, a second conductor 26 is arranged along the opposite side of the rail 10 and the trolley-frame has a companion contact roller 27 for engagement therewith.

In Figure 4, I have shown diagrammatically, a landing field or station, the numerals 28 indicating the various auxiliary rails switched on to the main rail 10 for incoming planes and the numerals 29 the rails for the outgoing planes which are likewise switched on to the corresponding main line rail. In practice, the elevated rail 10, upon approaching the landing field, gradually slopes toward the ground where the plane can be switched on to any one of the auxiliary rails to effect a safe landing against the wind.

By providing an electrically-operated and definitely guided airplane of this character, the present objections to commercial aviation are entirely eliminated and passengers are assured a maximum of safety. Furthermore, being electrically operated, the airplanes can proceed on long flights without having to stop for refueling and the space ordinarily utilized for fuel storage can be used to advantage for the carrying of additional passengers and freight.

I claim as my invention:—

1. A transportation system of the character described, comprising an airplane having an electrical power unit, a guide rail having a T-head arranged below the path of travel of said airplane, an electrical conductor carried by said rail for supplying current to the power unit, a trolley mounted on said rail and having guide rollers engaging the top and bottom faces of its T-head, said trolley also having a contact roller engaging said conductor, and a flexible connection between said airplane and said trolley and carrying an element for establishing an electric circuit between the conductor and the power unit of the airplane.

2. A transportation system of the character described, comprising an airplane having an electrical power unit, a guide rail having a T-head arranged below the path of travel of said airplane, an electrical conductor carried by said rail for supplying current to the power unit, a trolley mounted on said rail and having guide rollers engaging the top and bottom faces of its T-head, said trolley also having a contact roller engaging said conductor, a winding drum mounted on the airplane, a flexible conduit connecting the trolley with said winding drum for holding the airplane captive, and an element extending through said conduit for establishing an electric circuit between the conductor and the power unit of the airplane.

JULIUS MESSER.